United States Patent [19]

Malek

[11] Patent Number: 4,769,531
[45] Date of Patent: Sep. 6, 1988

[54] DIRECTION FINDER SYSTEM WITH INCLINED DETECTORS

[75] Inventor: Fritz J. Malek, Santa Barbara, Calif.

[73] Assignee: Santa Barbara Research Center, Goleta, Calif.

[21] Appl. No.: 804,710

[22] Filed: Dec. 5, 1985

[51] Int. Cl.$^4$ ................................................ G01J 1/20
[52] U.S. Cl. .................................. 250/203 R; 126/425
[58] Field of Search .................... 250/203 R, 203 S; 126/425; 356/141, 152; 244/3.16

[56] References Cited

U.S. PATENT DOCUMENTS

| | | | |
|---|---|---|---|
| 4,082,947 | 4/1978 | Haywood et al. | 250/203 S |
| 4,355,896 | 10/1982 | Laue | 250/203 S |
| 4,361,758 | 11/1982 | Rotolo | 250/203 S |
| 4,491,727 | 1/1985 | Appelbaum et al. | 250/203 S |

FOREIGN PATENT DOCUMENTS 3047724 7/1982 Fed. Rep. of Germany ... 250/203 S

Primary Examiner—David C. Nelms
Assistant Examiner—Stephone B. Allen
Attorney, Agent, or Firm—W. C. Schubert; V. G. Laslo; A. W. Karambelas

[57] ABSTRACT

A direction finding system for infrared radiation includes a set of four detectors uniformly positioned about the Z axis of a cartesian coordinate system with individual ones of the detectors having radiation detection surfaces facing the Z axis and being inclined relative to the Z axis. The detectors are inclined relative to an XY plane of the coordinate system. Signals of the detectors are fed into computer storage to permit computation of the direction of a source of radiant energy relative to the Z axis based on a ratio of magnitudes of the signals of the detectors.

4 Claims, 4 Drawing Sheets

FIG. I.

DIRECTION FINDER SYSTEM WITH INCLINED DETECTORS

BACKGROUND OF THE INVENTION

This invention relates to systems for finding the direction to a source of radiant energy and, more particularly, to a system employing four detectors of infrared radiation for finding the direction to an infrared source.

Direction finding equipment has been used for many years in a variety of situations such as in the locating of a source of distress signals at sea, the monitoring of unauthorized electromagnetic transmissions, and in military operations for the locating of an enemy threat. Direction finding apparatus operates in different parts of the electromagnetic spectrum, and employs detectors of electromagnetic radiation which are specialized for the portions of the spectrum being employed.

Of particular interest herein is the detection of radiation in the infrared portion of the electromagnetic spectrum, and the determination of the direction of a source of the radiation. Imaging systems operating with infrared radiation employ arrays of detectors wherein one such array employs many detectors, possibly over 100 detectors. Such arrays are scanned across a subject and produce a well-defined image wherein the directions to points of the image are well defined.

A problem arises in the case of direction finding equipment for the infrared portion of the electromagnetic spectrum in that the use of scanning arrays would be overly complex and provide far more data than is required for the establishment of a direction to a source of radiation. In addition, such scanning arrays typically view a relatively small sector of space and, therefore, would have limited utility in a direction finding environment.

SUMMARY OF THE INVENTION

The foregoing problem is overcome and other advantages are provided by a direction finder system which, in accordance with the invention, requires no more than four detectors of radiant energy plus electronic circuitry coupled thereto for the determination of the direction of a source of radiation. The system is operable either with or without optical components, and has a particularly simple construction in the absence of optical components such as lenses and mirrors. Furthermore, it is possible to construct the system with only three detectors as will be disclosed in reference to an alternative embodiment of the system.

A preferred embodiment of the system employs four infrared detectors. However, it is to be understood that the invention is not limited to the infrared (IR) portion of the spectrum, and may be employed, for example, in the UV (ultraviolet) portion as on a laser warning system which requires a direction finder covering not only the IR region of the spectrum but also the visible and the UV. In general, the invention is applicable whenever the wave length of the radiation of interest is short as compared to the dimensions of the detectors (or of the entrance pupil of the optical system in front of the detector) so that diffraction does not impair the desired accuracy.

Each of the detectors is characterized by a responsivity to incident radiation wherein the detector outputs an electric signal which varies in magnitude in accordance with the orientation of a wavefront of the radiation relative to a normal to a detection surface of the detector. The four detectors are arranged symmetrically about a central axis with the respective radiation surfaces being angled towards the axis. Radiation from a source located on the axis or angled thereto emits radiation towards the array of detectors. It is assumed that the distance to the source is very much greater than the spacing between the detectors so that a wavefront of radiation may be viewed as a substantially flat planar surface.

In the foregoing arrangement of the detectors, each of the detectors is oriented at a different orientation about the central axis of the array. The incoming wavefront is incident upon the detection surfaces of the detectors at differing angles of incidence. Therefore, the detectors output differing signal amplitudes in accordance with the angles of incidence. The detector signals are combined in electronic circuitry which calculates the direction to the source of radiation. The calculation is made in accordance with a preset algorithm. Different arrangements of the detectors are disclosed. An advantage of the invention is the simplicity with which a large field of view can be obtained.

BRIEF DESCRIPTION OF THE DRAWING

The foregoing aspects and other features of the invention are explained in the following description, taken in connection with the accompanying drawing wherein.

DETAILED DESCRIPTION

Figure 1:
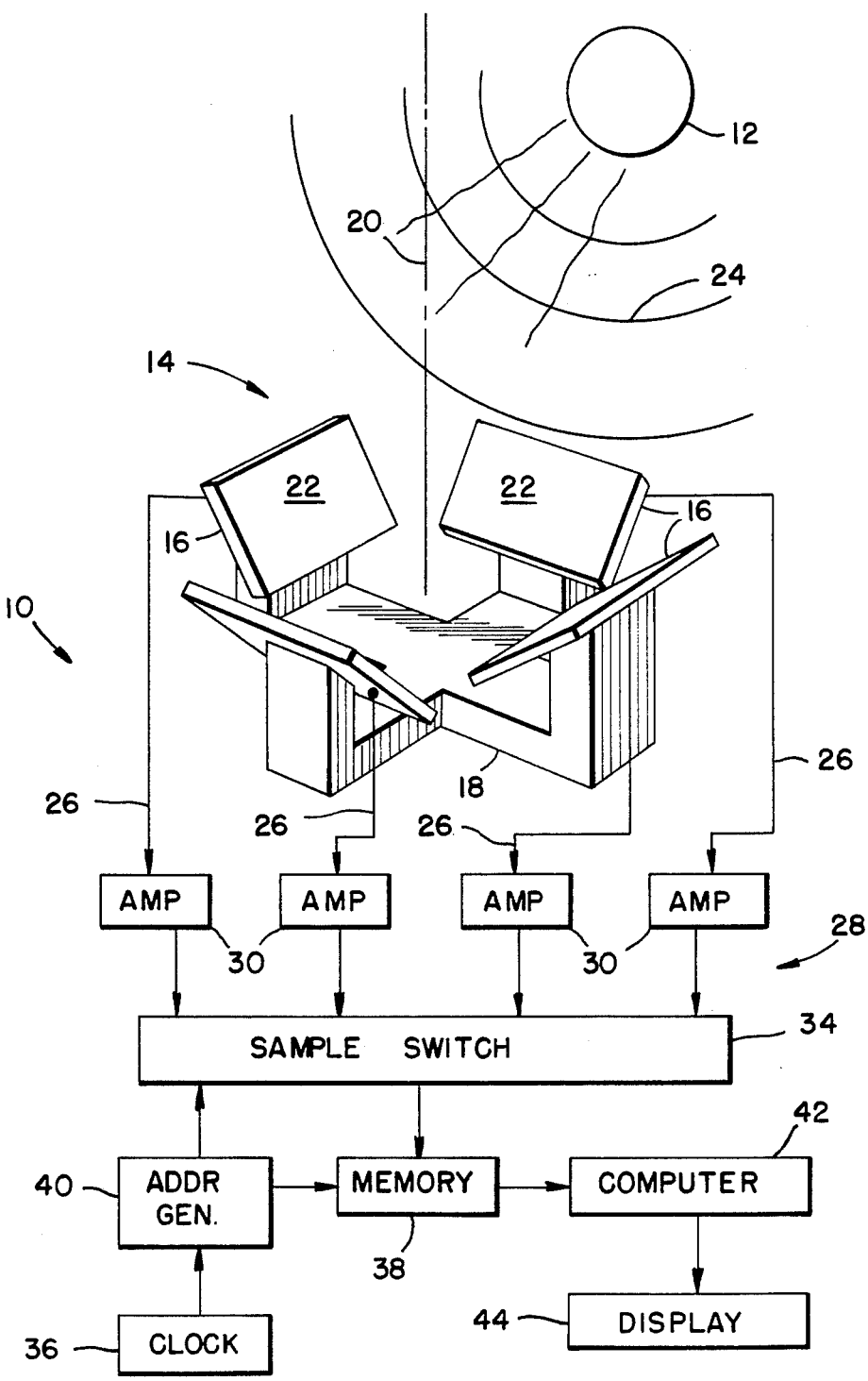
FIG. 1 as a diagrammatic view of an array of infrared detectors, the figure also including a block diagram of electronic circuitry coupled to the detectors for calculation of the direction of a source of radiation in accordance with the invention.

With reference to FIG. 1, there is shown a system 10 which is constructed in accordance with the invention for finding the direction of a source 12 of infrared radiation. The system 10 includes an array 14 of four detectors 16 of infrared radiation. The detectors 16 are positioned by a frame 18 about a central axis 20 of the array 14. The detectors 16 have radiation receiving surfaces 22 which face the axis 20 and are inclined such that normals to the surfaces 22 are angled relative to the axis 20. Radiation emitted by the source 12 develops wavefronts 24 which may be regarded as being substantially planar in the vicinity of the array 14 because the distance between the source 12 and the array 14 is presumed to be very much greater than the size of the array 14.

The detectors 16 may be formed with a well known structure, including photovoltaic material which converts incident infrared radiation to an electric signal, the electric signal being outputted via a line 26 from each of the detectors 16. The responsivity of a detector 16 is dependent on the angle of incidence of a wavefront 24 upon the surface 22, there being a maximum output signal of an individual one of the detectors 16 in the case of normal incidence of the wavefront 24. The detector output signal is smaller for the case of oblique incidence.

Electronic circuitry 28 connects to the detectors 16 for combining their output signals to determine the direction of the source 12 relative to the axis 20. The circuitry 28 comprises four amplifiers 30, a sampling switch 34, a clock 36, a memory 38, an address generator 40, a computer 42, and a display 44.

In operation, the amplifiers 30 connect with the detectors 16 via the lines 26 and amplify the detector output signals to a suitable level for operating components of the circuitry 28. The amplifiers 30 may include well known bandpass filters (not shown) for tuning the amplifiers 30 to the signal modulation frequency of the incident radiation from the source 12, the passbands of the filters being selected to equal the anticipated bandwidth of the signal from the source 12.

As will be taught with respect to an algorithm employed by the computer 42 in computing the direction of the source 12, such computation is based on the relative amplitudes of signals outputted by the detectors 16. In the implementation of such computation, normalization of the signals of the respective detectors 16 is accomplished automatically by virtue of the fact that formulas of the computation employ only ratios of signals of the detectors 16.

The signals of the amplifiers 30 are applied to the switch 34. The switch 34 is operated by an address signal provided by the generator 40 in response to clock pulses supplied by the clock 36. The address generator 40 applies a repeating sequence of addresses to the switch 34 to repetitively and sequentially sample signals of the amplifiers 30, and to apply samples of the amplifier signals to the memory 38. The memory 38 is also addressed by the generator 40 for receiving the signal samples from the switch 34. The stored signal samples in the memory 38 constitute data of the wavefront 24, which data is employed by the computer 42 to compute the direction of the source 12. The direction of the source 12 is outputted by the computer 42 for presentation on the display 44.

Figure 2:
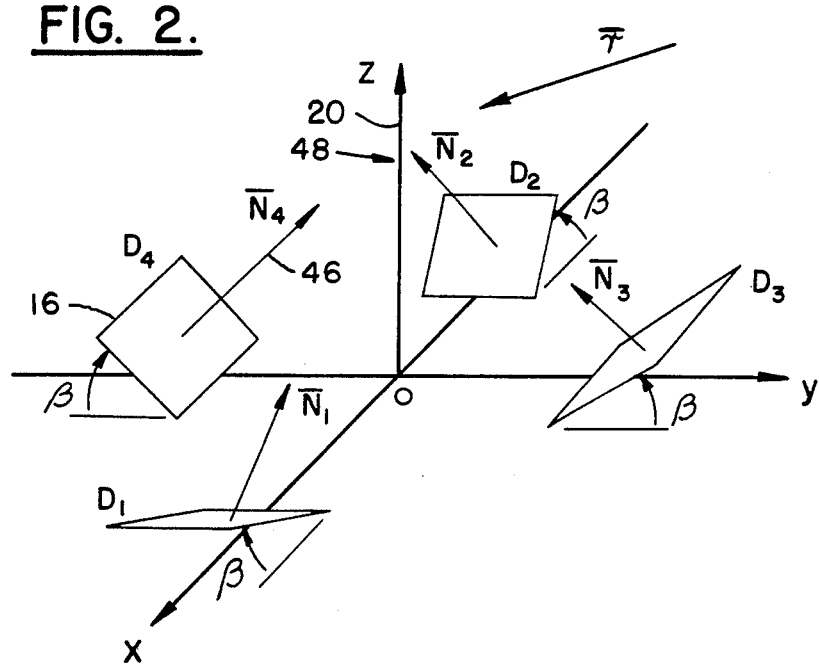
FIG. 2 is a simplified diagrammatic view of the array of detectors of FIG. 1, showing angles of inclination used in the calculation of the direction of the source of radiation.
Figure 3:
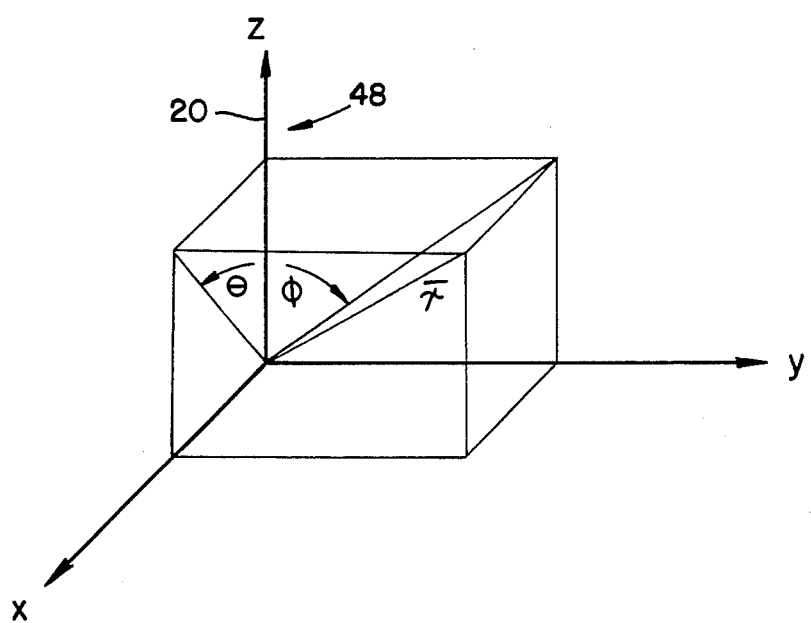
FIG. 3 shows angles used in reference to a cartesian coordinate system for describing the direction of the radiation source.

With reference also to FIGS. 2 and 3, there are shown normals 46 to the radiation receiving surfaces of the detectors 16. The four detectors 16 are identified by the legends $D_1$–$D_4$ with the normals 46 being similarly identified by the legends $N_1$–$N_4$. The detectors 16 are positioned on the X and the Y axes of a cartesian coordinate system 48 with the Z axis coinciding with the axis 20 of FIG. 1. Each of the radiation receiving surfaces of the detectors 16 is elevated by an angle beta ($\beta$) relative to a plane defined by the X and the Y axes. A vector r represents a direction of propagation of an incoming electromagnetic wave.

As shown in FIG. 3, the vector r is directed towards the origin of the coordinate system 48. The direction of the vector r is defined by two angles of inclination, one angle of inclination being designated as psi ($\phi$) in the YZ plane, and the second angle of inclination being identified as the angle theta ($\theta$) in the XZ plane.

The normals $N_1$ and $N_2$ lie in the XZ plane, and the normals $N_3$ and $N_4$ lie in a plane perpendicular to the XZ plane, namely, the YZ plane. The two planes intersect at the Z axis.

In the operation of the computer 42, the value of beta ($\beta$) is stored in the memory 38 for use in computations by the computer 42. The following two equations (or algorithms) are employed by the computer 42 to provide values for the angles theta and psi, namely:

$$\theta = \arctan\left[\frac{2(s_1 - s_2)}{\tan\beta(s_1 + s_2 + s_3 + s_4)}\right] \quad (1)$$

$$\phi = \arctan\left[\frac{2(s_3 - s_4)}{\tan\beta(s_1 + s_2 + s_3 + s_4)}\right] \quad (2)$$

wherein $s_1$, $s_2$, $s_3$, and $s_4$ represent strengths of the signals outputted by correspondingly numbered ones of the detectors 16.

Another set of expressions for the angles theta and psi are given by $$\theta = \arctan\left[\frac{s_1 + s_3 + s_4 - 3s_2}{\tan\beta(s_1 + s_2 + s_3 + s_4)}\right] \quad (3)$$

$$\phi = \arctan\left[\frac{s_1 + s_2 + s_3 - 3s_4}{\tan\beta(s_1 + s_2 + s_3 + s_4)}\right] \quad (4)$$

Yet another set of expressions for the angles theta and psi is given by $$\theta = \arctan\left[\frac{3s_1 - s_2 - s_3 - s_4}{\tan\beta(s_1 + s_2 + s_3 + s_4)}\right] \quad (5)$$

$$\phi = \arctan\left[\frac{3s_3 - s_1 - s_2 - s_4}{\tan\beta(s_1 + s_2 + s_3 + s_4)}\right] \quad (6)$$

The foregoing expressions are readily implemented by the computer 42 to provide the values theta and psi based on the normalized values of the detector signals. The values of theta and psi are applied to the display 44 for indicating the direction of the source 12 relative to the central axis 20 of the array 14.

Thereby, the invention has accomplished a major objective of finding the direction to a source of infrared radiation by use of a relatively few number of detectors. In addition, the arrangement of FIG. 1 is free of mirrors and lenses for added simplicity in the design of the equipment of the invention.

By way of example in alternative embodiments of the invention, it is noted that a lens may be employed in front of each of the surfaces 22 of the detectors 16 for improved capacity for gathering infrared radiation. While such lenses introduce additional complexity to the system 10, the configuration of the four detectors 16 is retained.

An optical system in front of a detector would provide optical gain equal to the ratio area of the entrance pupil of the optical system to the detector area. The same formulas for the angle are valid in this case when the normal to the detector is substituted by the normal to the entrance pupil area.

The price for higher sensitivity (optical gain) is a reduction of the field of view and a sensitivity to non-uniformities in the detectors. Also, no optical gain is obtainable when the field of view becomes large requiring a detector area comparable to the area of the entrance pupil of the optical system. The obtainable optical gain diminishes with increasing field of view.

Figure 4:
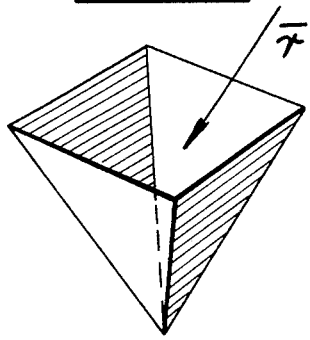
FIG. 4 shows diagrammatically an alternative arrangement of four detectors in the form of an inverted pyramid.
Figure 5A:
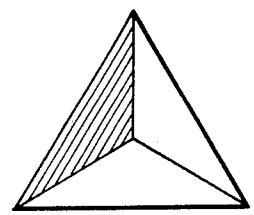
FIGS. 5A and 5B show respectively plan and perspective views of a further arrangement of three radiation detectors as a corner of a cube.
Figure 5B:
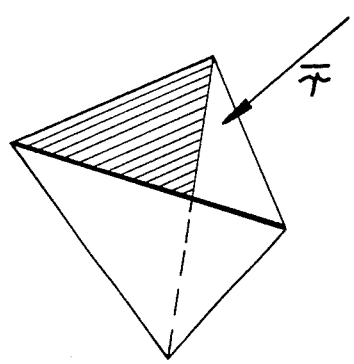

With reference also to FIGS. 4, 5A and 5B, there are disclosed alternative arrangements in which the spaced-apart detectors of FIG. 2 are brought together to be contiguous as shown in FIGS. 4, 5A and 5B. Also, in order to maintain the close positioning depicted in FIGS. 4, 5A and 5B, the detectors have been centrifuged with a triangular shape rather than the rectangular shape of FIG. 2. The rectangular shape enables the formation of the inverted pyramid in FIG. 4 and the formation of the corner of a cube shown in FIGS. 5A and 5B. The foregoing discussion of the calculation of the direction of the source applies also to the detector arrangement of FIG. 4, a calculation for the arrangement of FIGS. 5A–5B to be presented hereinafter.

Figure 6:
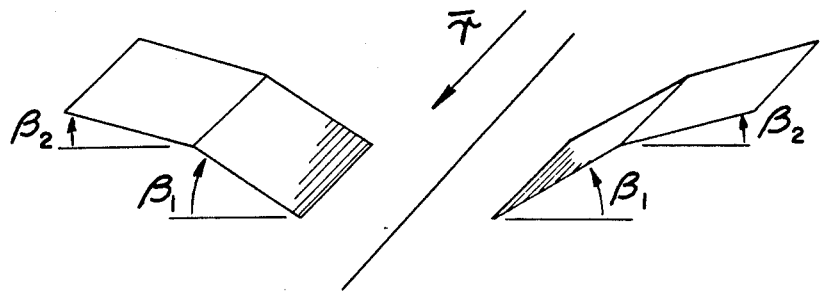
FIG. 6 shows four detectors arranged for a one-dimensional direction-finding system.

FIG. 6 shows an embodiment of the invention which may be employed in which increased directional measurement capacity is desired by use of only four detectors, and wherein the direction determination is to be accomplished in a single plane. Here, two rectangularly shaped detectors are positioned contiguous each other on opposite sides of the Z axis of the coordinate system 48 of FIG. 2. Angles of inclination relative to the XY plane are indicated by $\beta_1$ and $\beta_2$. The outboard detectors are positioned with greater angular divergence than the two inboard detectors so as to view a larger sector of space for determining the direction of the source. Data for use by the computer 42 is provided by the two outboard detectors for source direction which is heavily inclined away from the central axis 20 of the array 14 of FIG. 1, the two inboard detectors providing data for use by the computer 42 for computing the direction of a source which is more closely angled to the central axis 20.

In the following section, there are presented derivations of the formulas for the various embodiments of the invention. The case of three detectors, described below, applies also to the corner cube of FIGS. 5A–5B. It is noted that for the general case of finding the direction of incoming radiation in space, three detectors are sufficient but four would give a higher signal-to-noise ratio.

DERIVATIONS

Figure 7:
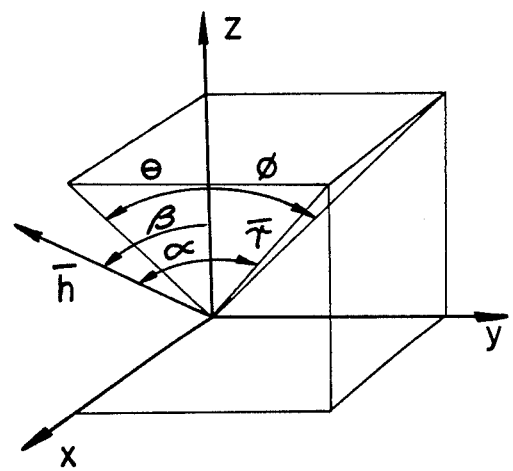
FIG. 7 is a coordinate system useful for the mathematic derivation of an expression for a system of four detectors.

Presented below are derivations of angles of incoming radiation as functions of the strengths of signals received at the detectors of the system embodiments of FIGS. 1–6. In the derivations, it is assumed that all detectors are of the same area and have the same responsivity. The signals from the detectors are proportional to the cosine of the angle, $\alpha$, formed by the direction of the incoming radiation, $\bar{r}$, and the normal to the surface of the detector, $\bar{n}$ (FIG. 7).

Figure 8:
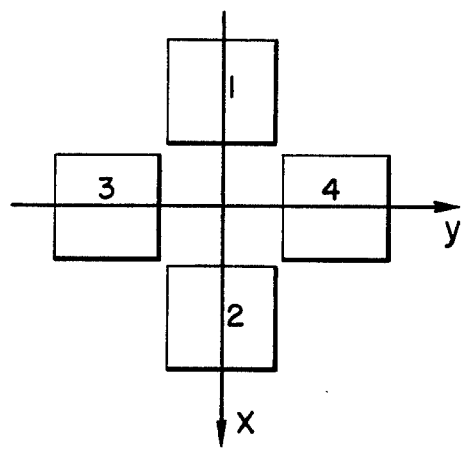
FIG. 8 shows an array of four detectors used in the mathematical derivation of a system of four detectors.

For detector 1 (FIG. 8):

$$s_1 = k \cos \alpha_1 = k \cdot \frac{\sin\theta\cos\phi\sin\beta + \cos\theta\cos\phi\cos\beta}{1 - \sin^2\theta\sin^2\phi}$$

For detector 2, with $-\beta \rightarrow \beta$ $$s_2 = k \cos \alpha_2 = k \cdot \frac{-\sin\theta\cos\phi\sin\beta + \cos\theta\cos\phi\cos\beta}{1 - \sin^2\theta\sin^2\phi}$$

For detector 3, with $\theta \rightarrow$, $\phi \rightarrow \theta$ $$s_3 = k \cos \alpha_3 = k \cdot \frac{\cos\theta\sin\phi\sin\beta + \cos\theta\cos\phi\cos\beta}{1 - \sin^2\theta\sin^2\phi}$$

For detector 4, with $\beta \rightarrow \beta$, $\theta \rightarrow \phi$, $\phi \rightarrow \theta$ $$s_4 = k \cos \alpha_4 = k \cdot \frac{-\cos\theta\sin\phi\sin\beta + \cos\theta\cos\phi\cos\beta}{1 - \sin^2\theta\sin^2\phi}$$

Then $s = s_1 + s_2 + s_3 + s_4 = \dfrac{4\cos\theta\cos\phi\cos\beta}{1 - \sin^2\theta\sin^2\phi}$ And $$\frac{s_1 - s_2}{s} = \frac{2\sin\theta\cos\phi\sin\beta}{4\cos\theta\cos\phi\cos\beta} = \frac{\tan\theta\tan\beta}{2}$$

Or $$\tan\theta = \frac{2(s_1 - s_2)}{\tan\beta(s_1 + s_2 + s_3 + s_4)}$$

Note that the $s_i$'s need not be normalized.

Since $s_1 + s_2 = s_3 + s_4$ and $s_1 = s_3 + s_4 - s_2$ $\tan \theta$ can be rewritten as $$\tan \theta = \frac{s_1 + (s_3 + s_4 - s_2) - 2s_2}{\tan\beta(s_1 + s_2 + s_3 + s_4)}$$

$$= \frac{s_1 + s_3 + s_4 - 3s_2}{\tan\beta(s_1 + s_2 + s_3 + s_4)}$$

Similarly, with $s_2 = s_3 + s_4 - s_4$ $$\tan \theta = \frac{3s_1 - s_2 - s_3 - s_4}{\tan\beta(s_1 + s_2 + s_3 + s_4)}$$

To obtain $\phi$ calculate $$\frac{s_3 - s_4}{s} = \frac{2\cos\theta\sin\phi\sin\beta}{4\cos\theta\cos\phi\cos\beta} = \frac{\tan\phi\tan\beta}{2}$$

or $$\tan\phi = \frac{2(s_3 - s_4)}{\tan\beta(s_1 + s_2 + s_3 + s_4)}$$

The other expressions for $\phi$ are obtained using $s_1 + s_2 = s_3 + s_4$ in the same manner as in the case of $\theta$.

Figure 9:
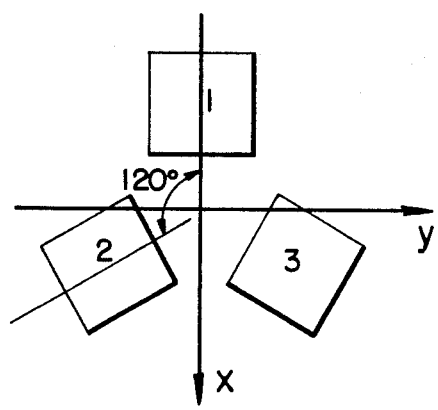
FIG. 9 is an array of three detectors for the derivation of a mathematical expression for a system of three detectors.

For three detectors (FIG. 9) the same expressions as in the four-detector case applies to Detector 1. For the normal on Detector 2, FIG. 10 applies.

Figure 10:
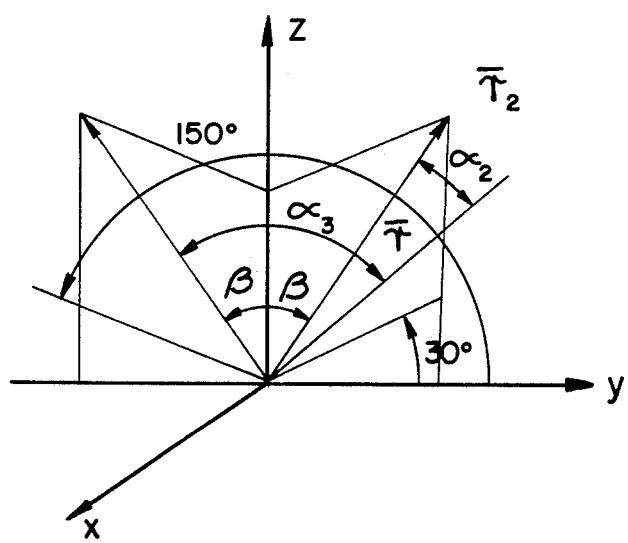
FIG. 10 is a coordinate system useful for the mathematical derivation of the expression for the system of three detectors.

Then from FIG. 10:

$$s_2 = k\cos\alpha_2 =$$

$$k\frac{-\sin 30°\sin\theta\cos\phi\sin\beta + \cos 30°\cos\theta\sin\phi\sin\beta + \cos\theta\cos\phi\cos\beta}{\sqrt{1 - \sin^2\theta\sin^2\phi}}$$

and $s_3 = k\cos\alpha_3 =$ $$k\frac{-\sin 150°\sin\theta\cos\phi\sin\beta + \cos 150°\cos\theta\sin\phi\sin\beta + \cos\theta\cos\phi\cos\beta}{\sqrt{1 - \sin^2\theta\sin^2\phi}}$$

For $\sin 30° = \sin 150° = \tfrac{1}{2}$ and $\cos 30° = -\cos 150° = \sqrt{3}/2$
there is obtained $$s_1 + s_2 + s_3 = \frac{3\cos\theta\cos\phi\cos\beta}{\sqrt{1 - \sin^2\theta\sin^2\phi}}$$

and similarly as before, $$\frac{s_1}{s_1 + s_2 + s_3} = \frac{1}{3}(\tan\theta\tan\beta + 1)$$

and $$\frac{s_2 - s_3}{s_1 + s_2 + s_3} = \frac{\sqrt{3}}{3}\tan\phi\tan\beta$$

Then $$\tan\theta = \frac{2s_1 - s_2 - s_3}{\tan\beta\,(s_1 + s_2 + s_3)}$$

and $$\tan\phi = \frac{\sqrt{3}\,(s_2 - s_3)}{\tan\beta(s_1 + s_2 + s_3)}$$

For the single-axis system (FIGS. 6 and 11) the formulas of the four-detector case can be used. But as only one angle is of interest and $s_3 = s_4 = 0$ $$\tan = \frac{s_1 - s_2}{\tan(s_1 + s_2)}$$

Figure 11:
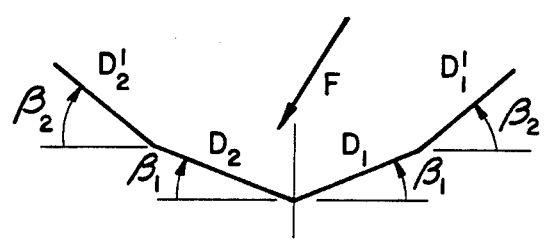
FIG. 11 is a diagram useful in the derivation of a mathematical expression for array of four detectors arranged along a line.

For the single axis system with four detectors we obtain from FIG. 11.

$$\tan\theta = \frac{s_1 - s_2}{\tan\beta_1(s_1 + s_2)} = \frac{s_1' - s_2'}{\tan\beta_2(s_1' + s_2')}$$

$$\tan\theta = \frac{1}{2}\left[\frac{s_1 - s_2}{\tan\beta_1(s_1 + s_2)} + \frac{s_1' - s_2'}{\tan\beta_2(s_1' + s_2')}\right]$$

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

I claim:

1. A direction finder system comprising:
    an array of radiation detectors positioned for simultaneously detecting an incoming wave of radiant energy, there being a first and a second one of said detectors positioned on opposite sides of a central axis of said array, there being a third and a fourth one of said detectors positioned on opposite sides of said central axis and spaced apart from said first and said second detectors, each of said detectors being inclined relative to said central axis for receiving such wave of radiant energy from a source of the radiant energy located in a sector of space including said central axis, each of said detectors producing a signal upon detection of an incident wave of the radiant energy, the strength of each signal depending on the orientation of a radiation-receiving surface of the corresponding detector relative to the direction of propagation of said wave; and
    means responsive to continuous variations in amplitude of the detector signals for combining the signals of said detectors by an algebraic trigonometric relationship to obtain the direction of a source of said wave, said combining being based on the ratio of signals of respective ones of said detectors to accomplish normalization of respective ones of the detector signals.

2. A system according to claim 1 wherein said four detectors are spaced uniformly about said central axis.

3. A system according to claim 2 wherein said central axis is in view of radiation receiving surfaces of said detectors.

4. A system according to claim 3 wherein each of said detectors is provided with a triangular shape, said detectors being positioned in pyramidal format.

* * * * *